United States Patent [19]

Mays

[11] Patent Number: 4,483,456

[45] Date of Patent: Nov. 20, 1984

[54] SALVAGEABLE INDUSTRIAL CONTAINER

[75] Inventor: Harry W. Mays, Merced, Calif.

[73] Assignee: Rheem Manufacturing Company, New York, N.Y.

[21] Appl. No.: 340,050

[22] Filed: Jan. 18, 1982

[51] Int. Cl.³ .......................... B65D 6/36; B65D 8/10
[52] U.S. Cl. ...................................... 220/67; 229/5.6; 229/5.7
[58] Field of Search ............... 220/67, 66, 319; 229/5.5, 5.6, 5.7

[56] References Cited

U.S. PATENT DOCUMENTS

| 2,307,923 | 1/1943 | Eggerss ................................ 229/5.7 |
| 2,362,846 | 11/1944 | O'Brien . |
| 2,971,671 | 2/1961 | Shakman ................................ 220/66 |
| 3,357,626 | 12/1967 | Carpenter et al. ..................... 229/5.6 |
| 3,922,984 | 12/1975 | Zuideveld et al. . |
| 3,955,705 | 5/1976 | DuBois et al. ........................ 229/5.6 |
| 4,106,659 | 8/1978 | Dent et al. ........................... 220/67 |

Primary Examiner—Stephen Marcus
Assistant Examiner—Robert Petrik
Attorney, Agent, or Firm—Hopgood, Calimafde, Kalil, Blaustein & Judlowe

[57] ABSTRACT

A right circular cylindrical end of an industrial container or drum shell is embraced by a peripheral channel on an end closure which channel is, in turn, embraced by a channel shaped chime ring, and the assembly thus produced is compressed in the radial direction and curled radially inwardly to provide an end seam that has the shape of the radially outer surface of a torus. A circumferential groove is formed in the shell a predetermined distance from the rim of said shell end, and the radially outer skirt of the chime ring extends into said groove.

For reclamation the curled seam is straightened and the extending portion of the radially outer skirt of the chime ring is severed from the remainder of the chime ring to permit axial separation of said remainder of the chime ring, followed by the end closure, from the shell, whereby the shell and end closure can be reconditioned and reused.

2 Claims, 9 Drawing Figures

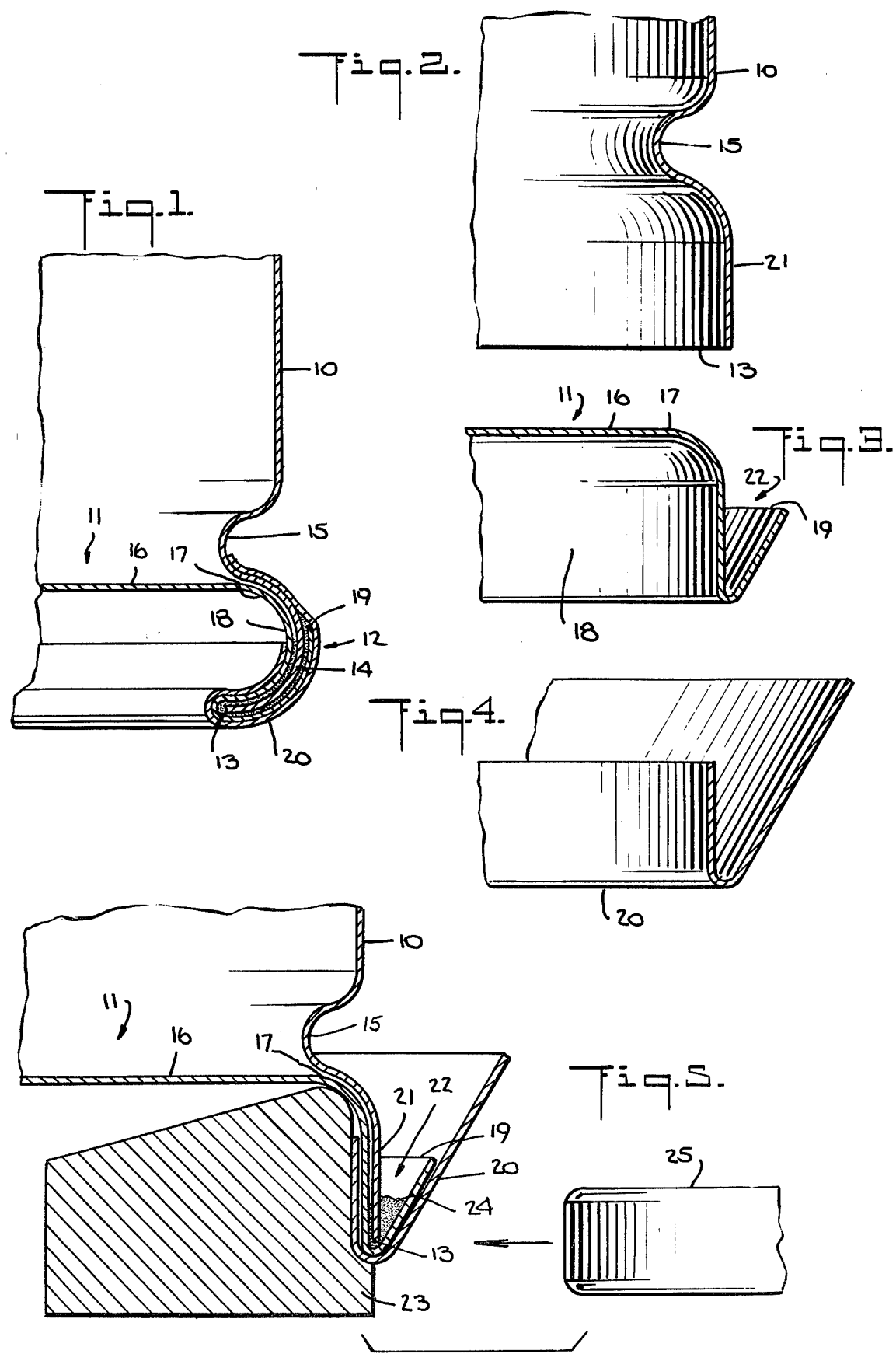

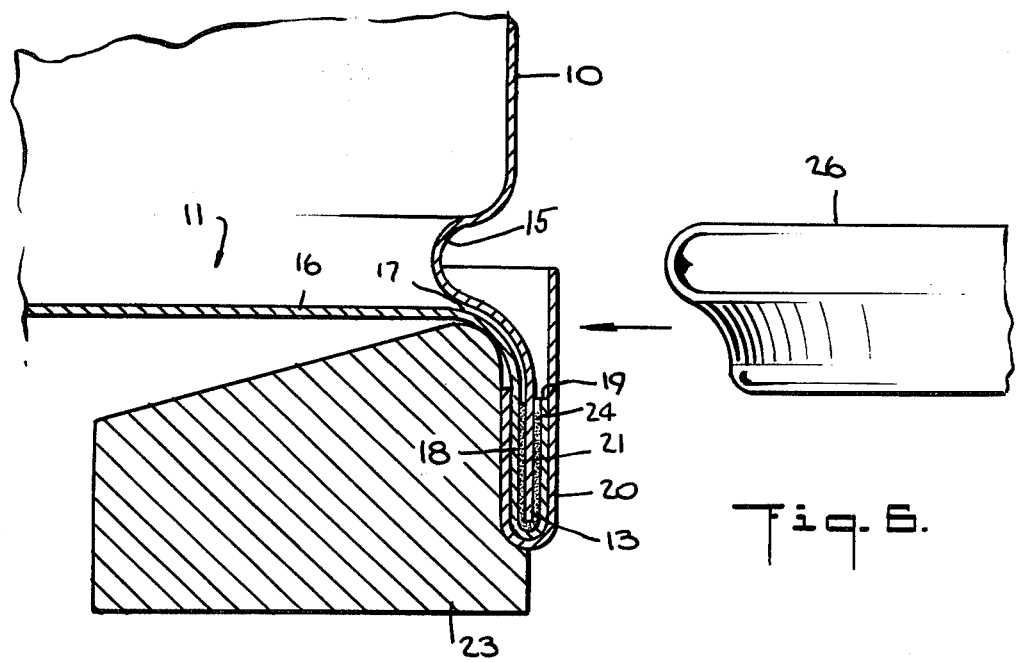
Fig. 6.
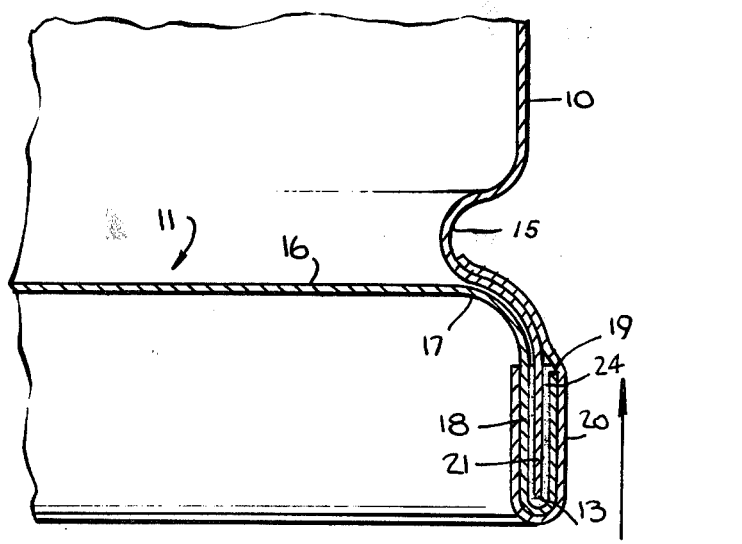
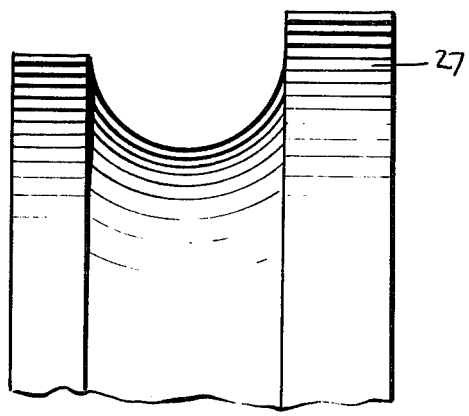
Fig. 7.

SALVAGEABLE INDUSTRIAL CONTAINER

BACKGROUND OF THE INVENTION

The present invention relates to industrial containers or drums and, more particularly, to containers of the type that are desirably salvaged, reconditioned and reused.

In the construction of large metal drums a cylindrical shell is joined by a seam to an end closure. Various constructional methods have been employed heretofore in the fabrication of such drums. A common method is to produce a cylindrical shell with radial flanges at its ends to which is assembled a radially flanged end closure whereupon the mating parts are rolled or curled to form a seam. It is also known to form such containers by starting with an unflanged cylindrical shell to which an end closure is assembled whereupon the mating parts are rolled and formed to produce the seam.

Under certain conditions it becomes economically attractive to be able to salvage the principle components of the drum or container after use, to recondition the parts and provide for a reusable container.

One technique for reconditioning a container is described in U.S. Pat. No. 3,922,984 issued Dec. 2, 1975. The container described in said patent has a radially outwardly projecting spiral seam formed by an end wall and body wall of the container which seam is unrolled by a tool that embraces the shell and moves in the longitudinal direction of the shell relative thereto. Various other methods for reconditioning containers are summarized in said patent but none is entirely satisfactory.

SUMMARY OF THE INVENTION

It has now been discovered that a novel fluid-tight seal and mechanical seam can be produced between the end closure and container shell or body having various advantages over those constructions known heretofore. In particular, the seam contemplated by the present invention is located radially inwardly of the radially outer surface of the shell of the container whereby it is protected from damage when the container is in use. Furthermore, the seam has a configuration such that if the drum or container is dropped so as to land on the seam the seam will tend to tighten rather than loosen. The present construction also provides for an extra layer of metal between the seam seal and the surface of the drum on which the drum normally stands as compared with that found in conventional seams so that the seam seal according to the present invention is better protected from abrasion and wear.

Another advantage of the present invention is that the subject seam can be opened and the end closure disassembled from the shell without damage to either so that the parts can be reused. A further advantage is that the shell, after being salvaged, can be provided optionally with a radial flange at its end and assembled to the type of end closure that is in general use today.

One further advantage of the present invention is obtained when the containers contemplated herein require that the surfaces be plated or coated to meet certain specific specifications. Where a shell having a radial flange at its end is coated there exists a drainage problem associated with any dipping or coating operation. As will appear from the present disclosure, the shell employed in the practice of the present invention does not have a radial flange and, therefore, is better adapted to plating or coating.

In accordance with one aspect of the present invention there is provided an industrial container of malleable material comprising in combination a cylindrical shell and at least one end closure, characterized in that said shell is provided with a circumferential radially inwardly directed groove spaced a predetermined distance from one rim of said shell and providing a seat for said end closure, said end closure is set in the end of such shell on said seat with a circumferential peripheral portion formed with a channel that receives and embraces said shell rim, and said peripheral portion of said end closure is embraced, in turn, by a channel shaped chime ring, the said chime ring, closure peripheral portion and shell rim being compressed in the radial direction and curled radially inwardly to form a curled seam, the radially outer portion of said chime ring extending around said peripheral portion of said end closure past the rim of said end closure radially inwardly into said groove.

In accordance with another aspect of the present invention there is provided a method for disassembling a container constructed as mentioned above, said method comprising the steps of uncurling said curled seam to provide a right circular cylindrical seam, severing the circumferential portion of said chime ring that extends into said groove from the remainder of said chime ring, and displacing said chime ring remainder and said end closure in the axial direction relative to said shell away from said seat.

As a corollary to the foregoing there is also provided a method for assembling the described container that comprises the steps of taking a right circular cylindrical shell of malleable material, forming said radially inwardly directed circumferential groove in the wall of said shell, disposing said end closure within said one end of said shell on said seat with a peripheral channel portion embracing the rim of said shell, disposing a quantity of sealant within said channel, disposing a channel shaped chime ring over the concentric cylindrical portions of said shell rim and end closure, and sequentially radially compressing and curling radially inwardly said chime ring and the material it embraces to form said curled seal.

BRIEF DESCRIPTION OF THE DRAWINGS

The invention will be better understood after reading the following detailed description of the presently preferred embodiment thereof with reference to the appended drawings in which:

FIG. 1 is a fragmentary vertical sectional view through an assembled container showing the construction of the finished seam;

FIG. 2 is a similar view of the drum shell prior to assembly;

FIG. 3 is a similar view of the end closure prior to assembly;

FIG. 4 is a similar view of the chime ring prior to assembly;

FIG. 5 is a fragmentary view showing the first step in the assembly operation;

FIG. 6 is a view similar to FIG. 5 showing the components after the first assembly operation and in preparation for the second assembly operation;

FIG. 7 is a view similar to the preceding views showing the assembly after completion of the second assembly operation and in readiness for the third and final assembly step;

The same reference numerals are used throughout the figures of the drawings to designate the same or similar parts.

DETAILED DESCRIPTION OF THE PREFERRED EMBODIMENT

Figure 8:
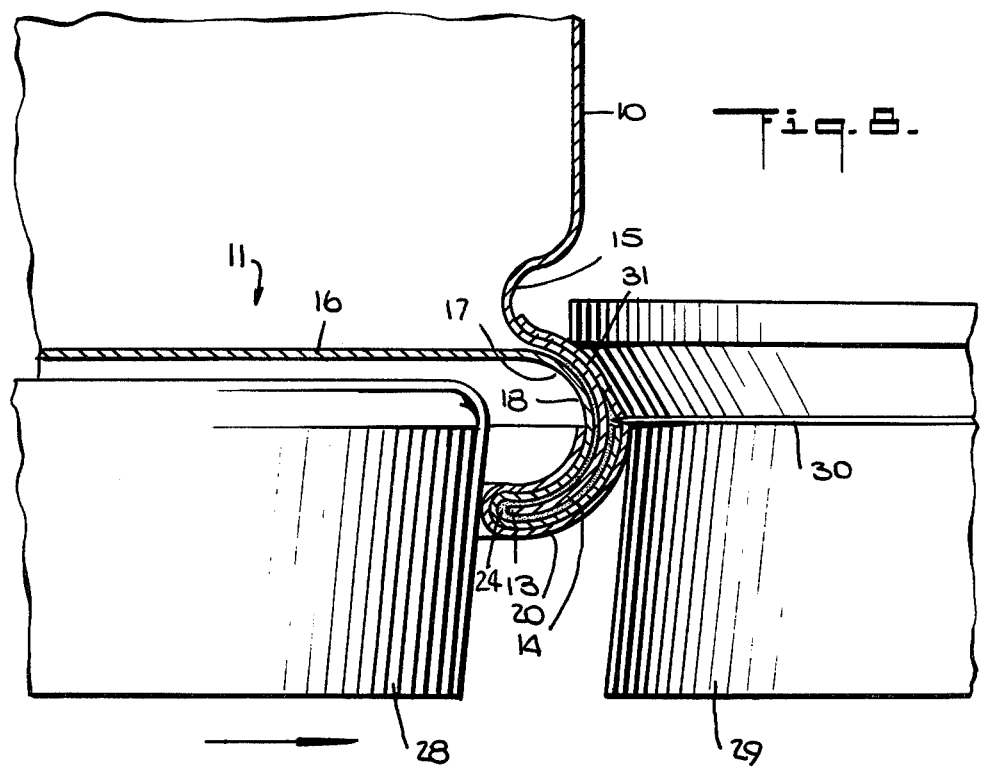
FIG. 8 is a view similar to the preceding but showing an assembled container between the forming members for performing the first disassembly operation.

Referring now to FIG. 1 there is shown therein a section through one end of a container body or shell 10 joined to an end closure 11 that may be either the head or bottom closure. It will be understood that both closures may be assembled to the shell in the same manner or one can be assembled as disclosed herein while the other is assembled by any other known procedure.

Shell 10 will be formed of steel or other malleable material and is joined to the end closure 11 by a circumferential seam 12. Commencing at the rim 13 of the shell 10 within the seam 12 and traveling away from rim 13 in the longitudinal direction of the container, it will be seen that the shell 10 has a curled circumferential portion 14 that follows the radially outer portion of a toroidal surface centered on the longitudinal axis of the shell 10 until it merges with a radially inwardly directed circumferential groove 15 whereby a longitudinal section through the shell 10, as seen in FIG. 1, appears S-shaped at the end thereof.

The end closure 11 is set within the curled portion 14 of the shell 10 and includes a central portion 16 merging at its periphery 17 with a seam forming portion 18 that closely follows, from the boundary 17 of said central portion 16 to the rim 19 of the closure 11, first the radially inner surface of the curled portion 14 of the shell 10 toward the shell rim 13 and is then cuffed radially outwardly back and over the radially outer surface of the curled portion 14 terminating short of the circumferential groove 15. The seam forming portion 18 is closely embraced by a circumferential chime ring 20 wherein the radially outer portion of the ring 20 extends in the longitudinal direction of the shell 10 beyond the rim 19 of the closure member 16 and radially inwardly into the circumferential groove 15.

As seen in FIG. 2, the shell 10 prior to assembly is of right circular cylindrical form including the extreme end portion 21 that is subsequently formed into the curled portion 14. The end closure prior to assembly is shown in FIG. 3. It is provided with a peripheral channel portion 22 that surrounds the central portion 16 and becomes the seam forming portion 18 in the assembled container. The radially inner portion of the seam forming portion 18 is shown as being right circular cylindrical while the radially outer section of the seam forming portion flares radially outwardly providing the channel 22 for receiving and embracing the rim 13 of the shell 10 when the end closure is telescopingly assembled thereto.

In FIG. 4 there is shown the chime ring 20 prior to assembly. It also is channel shaped and congruent in its essential character to the channel portion of the end closure so as to telescope thereover upon assembly.

During the assembly operation the three components shown in FIGS. 2, 3 and 4 are interfitted, one within the other, and supported by a chuck ring 23, as shown in FIG. 5 to which attention should now be directed. At the time of initial assembly, suitable seaming or sealing compound 24 should be disposed within the channel 22 of the end closure 11. During the first forming operation a suitable roll 25 is applied radially inwardly to compress the seam forming members in the radial direction resulting in the intermediate assembly shown in FIG. 6. As seen in the latter figure, a second roll 26 is then brought in radially to further form the chime portion of the seam until the assembly assumes the configuration shown in FIG. 7 whereupon a curling roll 27 is brought into operation to impart a radially inwardly directed curl to the seam as shown in FIG. 1.

Referring again to FIG. 1 it should be apparent that if the container with the seam as described herein is dropped so as to land on the seam the seam will tend to curl further inwardly into a tighter configuration such that disruption of the seal provided thereby is unlikely.

Figure 9:
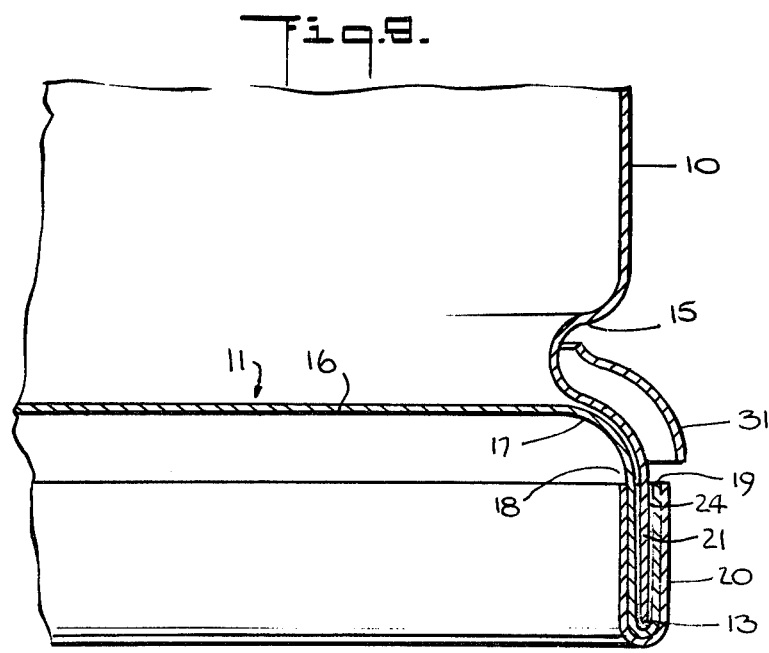
FIG. 9 is a view similar to the preceding and illustrating the final disassembly operations.

When it is desired to disassemble the container, the seam can be interposed between rolls 28 and 29 as shown in FIG. 8 that perform a dual function simultaneously. The first function is to uncurl the curled portion of the seam. Simultaneously a circular knife edge 30 on the roll 29 performs the second function of severing the circumferential portion 31 of the chime ring 20 that extends into the groove thereby separating the portion 31 from the remainder of the chime ring 20. The seam will now have the form of a right circular cylinder as shown in FIG. 9 whereupon the remaining portion of the chime ring 20 can be stripped from about the end closure and the end closure 11 can be separated from the shell 10. The severed portion 31 of the chime ring that remains encircling the body or shell 10 can be snipped or otherwise severed in order to split the ring for subsequent removal.

It should now be apparent that the shell 10 and end closure 11 can be reconditioned and reused with a new chime ring or the shell 10 may be provided with a radial flange and assembled to a flanged end closure.

Having described the presently preferred embodiment of the invention it should be understood that various changes in detail may be effected by those skilled in the subject art without departing from the true scope of the invention as defined in the appended claims.

What is claimed is:

1. An industrial container of malleable material comprising in combination a cylindrical shell and at least one end closure, characterized in that said shell and end closure are joined at one end of said shell by a circumferential seam in which said shell commencing at the shell rim within said seam and traveling away from said rim in the longitudinal direction of said container has a curled circumferential portion that follows the radially outer portion of a toroidal surface centered on the longitudinal axis of said shell until it merges with a radially inwardly directed circumferential groove whereby a longitudinal section through said shell appears S-shaped at said one end, said end closure is set within said curled portion of said shell and includes a central portion merging at its periphery with a seam forming portion that closely follows from the boundary of said central portion to the rim of said closure first the radially inner surface of said curled portion of said shell toward the said shell rim and is then cuffed radially outwardly back and over the radially outer surface of said curled portion terminating short of said circumferential groove, and said seam forming portion is closely embraced by a circumferential chime ring wherein the radially outer portion of said ring extends in the longitudinal direction of said shell beyond the rim of said end closure and radially inwardly into said circumferential groove.

2. An industrial container of malleable material comprising in combination a cylindrical shell and at least one end closure, characterized in that said shell is provided with a circumferential radially inwardly directed groove spaced a predetermined distance from one rim of said shell and providing a seat for said end closure, said end closure is set in the end of said shell on said seat with a circumferential peripheral portion formed with a channel that receives and embraces said shell rim, and said peripheral portion of said end closure is embraced in turn by a channel shaped chime ring, the said chime ring, closure peripheral portion and shell rim being compressed in the radial direction and curled radially inwardly forming a curled seam, the radially outer portion of said chime ring extending around said peripheral portion of said end closure past the rim of said end closure radially inwardly into said groove.

* * * * *